May 13, 1930.　　　D. L. JOHNSON　　　1,758,607
PLANTER
Filed June 5, 1928　　　3 Sheets-Sheet 1

Inventor
D. L. Johnson
By Lacey & Lacey, Attorneys

May 13, 1930. D. L. JOHNSON 1,758,607
PLANTER
Filed June 5, 1928 3 Sheets-Sheet 2

Inventor
D. L. Johnson
By Lacey & Lacey, Attorneys

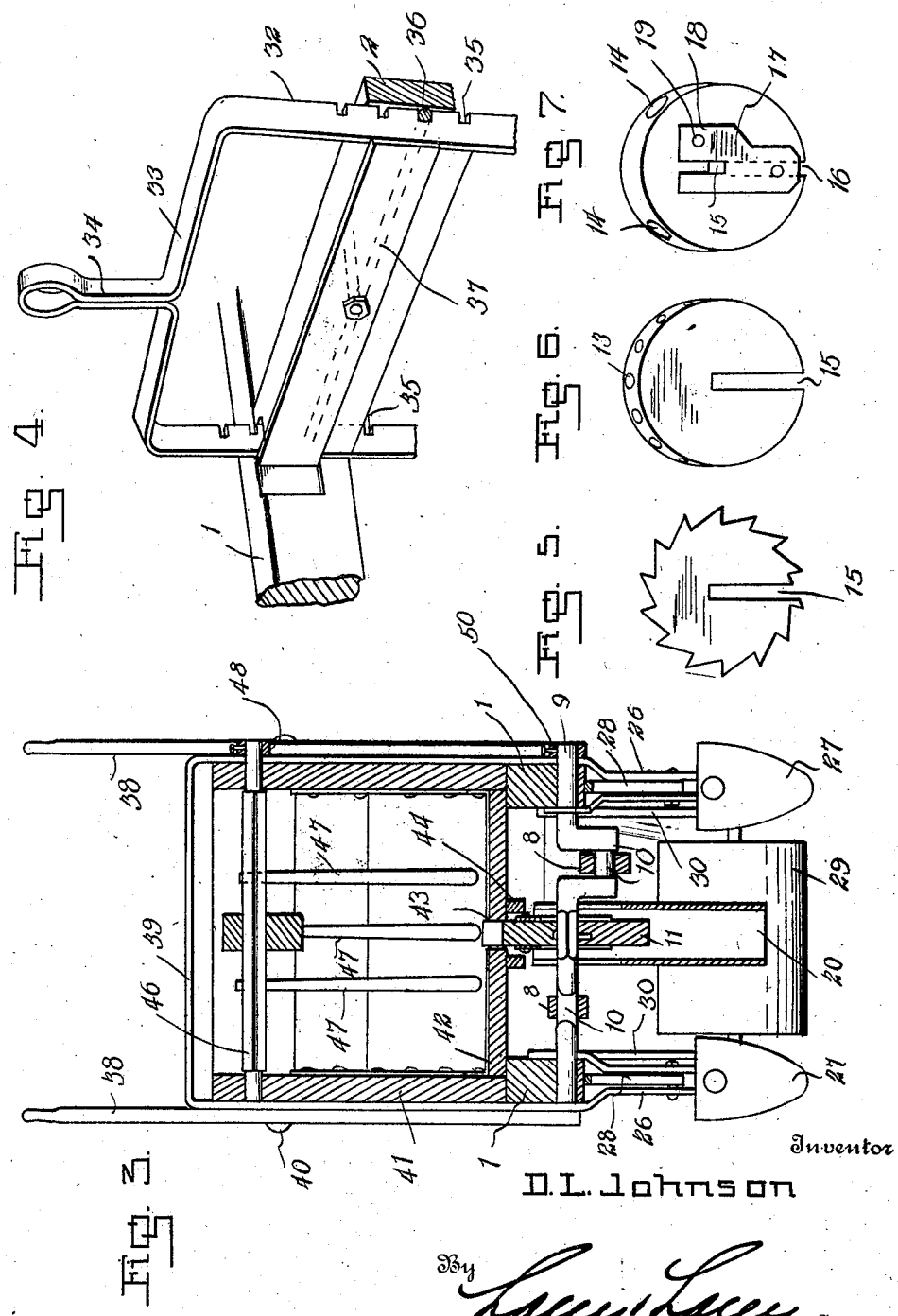

Patented May 13, 1930

1,758,607

UNITED STATES PATENT OFFICE

DOLPHUS L. JOHNSON, OF GLENDORA, MISSISSIPPI

PLANTER

Application filed June 5, 1928. Serial No. 283,034.

This invention relates to planters and has for its object the provision of an easily operated planter which may be quickly adjusted for planting various crops and in which the hopper will be so mounted that it may be readily removed from over the seed-dropping elements, to permit access to the latter for changing, cleaning or repairing the same. The invention also has for its object the provision of a construction whereby loss of seed will be prevented, and also the provision of means whereby any desired pressure may be exerted by the covering roller. The invention is illustrated in the accompanying drawings and will be hereinafter fully set forth.

In the drawings:

Fig. 3 is a transverse section taken centrally through the hopper;

Fig. 4 is a detail of the means for mounting the presser roller, and

Figs. 5, 6 and 7 are details showing different forms of seed droppers.

Figure 2:
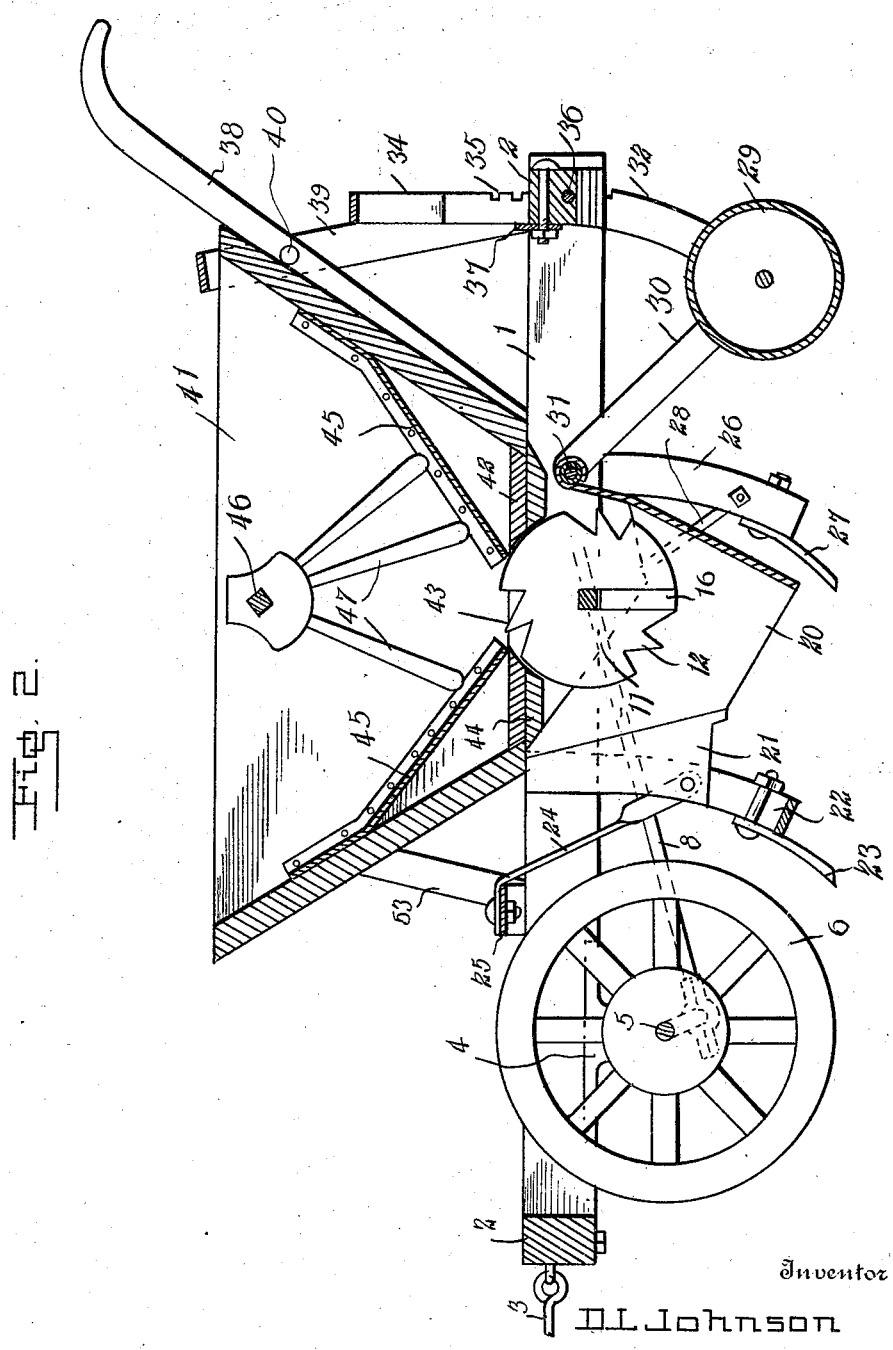
Fig. 2 is a longitudinal vertical section of the same.

The frame of the planter comprises sills or side bars 1 connected at their front and rear ends by cross bars 2 to produce a rigid frame, and draft elements 3 are attached to the front end of the frame whereby the planter may be drawn over the field by draft animals. Bearing brackets 4 are secured to the side bars adjacent the front ends thereof to support an axle 5 having ground wheels 6 secured upon its ends and the intermediate portions of the axle are formed into cranks 7 with which are engaged the front ends of pitmen 8 extending rearwardly to the seed dropper. The seed dropper comprises a shaft 9 mounted in suitable bearings provided therefor upon the side bars or sills 1 approximately midway the ends of said bars and having its intermediate portion formed into cranks 10, as shown in Fig 3, and it will be noted, particularly upon reference to Fig. 3, that the cranks are disposed at an angle of ninety degrees to each other whereby dead centers are overcome, the same arrangement of the cranks 7 being employed. The seed dropper comprises a disk or roller 11 which is fixed upon the shaft 9 at the center of the same and is provided in its periphery with recesses or seat pockets 12 which may be of any preferred form and arranged at selected distances around the disk. This disk is secured firmly to the shaft so as to rotate therewith but it is removable so that a disk of the proper form to be successfully used with the given crop may be employed. In Fig. 2, I have shown the disk as provided with three pairs of seed pockets arranged equidistantly about its periphery, and these pockets are of triangular form extending entirely across the disk whereby the seed may be deposited in pairs.

In Fig. 5, there is shown a disk in which triangular recesses form a continuous series of pockets and this disk is more particularly adapted for planting crops which should be sowed more closely. In Fig. 6 is shown a disk in which the pockets are circular cavities, indicated at 13, and forming a series extending around the periphery of the disk in rather closely spaced relation, this form of disk being adapted for planting small seeds, such as peas or corn, while in Fig. 7 is shown a disk having larger somewhat elongated pockets 14 rather widely spaced apart for receiving beans and similar seed. In all forms of the planting disk, there is provided a radial slot 15 extending from the center to the edge of the disk and adapted to receive a key, such as 16, whereby the slot will be closed, and this key or filler is provided with an attaching plate 17 adapted to extend past the shaft 9 at opposite sides of the same and is provided with an ear 18 through which a fastening nail or the like may be passed to secure the plate to the disk. The disk may, consequently, be very easily attached to or removed from the planting shaft but when attached there will be no cavities which might receive seed from the hopper as the dropping disk is rotated.

Secured to the frame and enclosing the lower portion of the dropping disk between the pitmen 8 is a seed chute 20 which is open at its lower end and is comparatively narrow so that it will fit close enough to the dropping disk to guide the seed discharging therefrom and has its front end closed by a filler block 21 in an obvious manner. Secured to the front end of the seed chute is a shank or standard 22, to the lower end of which is secured an opener plow 23, as shown clearly in Fig. 2. This standard 22 is further held against displacement under the thrust upon the shovel 23 by braces 24 which are secured to the standard near the lower front corners of the seed chute and the filler block 21 and extend upwardly therefrom to be secured to a cross bar 25 secured to and extending across the sills 1, as shown in Figs. 1 and 2 and as will be understood.

Figure 1:
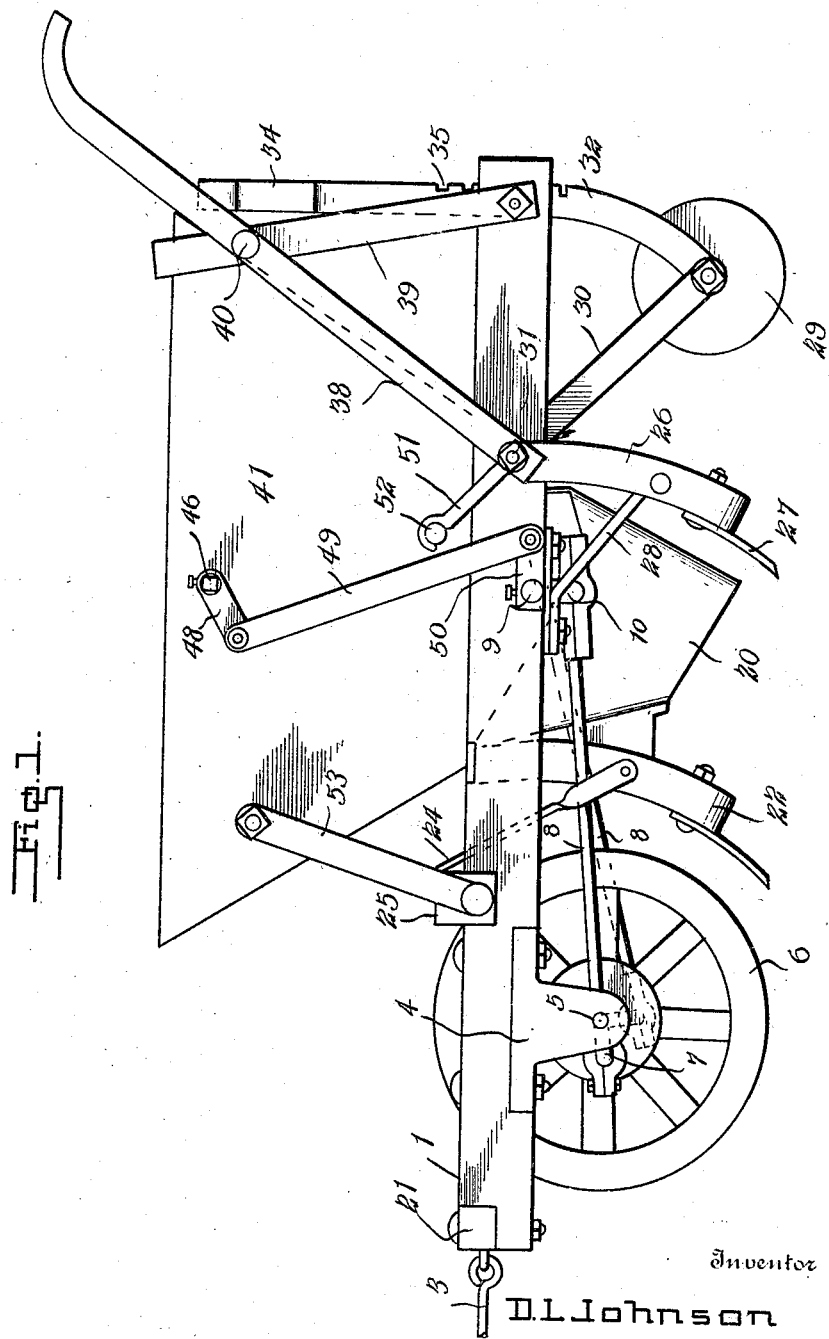
Figure 1 is a side elevation of a planter embodying my invention.

At the rear of the seed chute 20, standards or shanks 26 similar in all respects to the standard 22 are attached to the sills and carry at their lower ends covering plows or shovels 27, braces 28 being attached to the standards 26 and extending upwardly and forwardly therefrom to be attached to the sills, as shown most clearly in Fig. 1. These covering plows, as shown most clearly in Fig. 3, are arranged to run at the sides of the furrow so that the soil turned up from the furrow will be returned thereinto after the seed has been deposited. There is also provided a covering roller 29 which is adapted to run over the furrow and press the soil into a smooth firm condition over the seed, as will be understood. This roller is carried by hangers 30 which extend upwardly and forwardly from the axle or trunnions of the roller and are pivoted upon the same rod 31 which supports the rear end of the seed chute 20. The rear cross bar 2 is recessed at its ends, as will be understood upon reference to Fig. 4, and the side members 32 of an adjusting hanger pass vertically through said recesses, said side members 32 being also fitted at their lower extremities upon the trunnions or axle of the presser roller, as shown in Fig. 1. The upper ends of the members 32 are connected by a cross bar 33 from which rises a central handle member 34 of any approved form. The rear edges of the members 32 are formed with a series of notches 35 which are adapted to engage the bolt 36 which passes through the cross bar 2 and secures the same to the sills 1, the force exerted by the presser roller upon the soil being regulated by engaging one or another of the notches 35 over the bolt 36, as will be understood. In order to maintain the engagement of the notched side bars 32 with the bolt 36, a retainer spring 37 is secured to the front side of the cross bar 2 at the center of the same and has its ends bearing against the front edges of the side members 32 so as to press them into engagement with the bolt 36. If it be desired to change the setting of the presser roller, a slight forward impulse exerted upon the handle 34 will overcome the spring 37 sufficiently to release the notches 35 from the bolt 36, whereupon the presser roller may be raised or lowered and reset.

Handles 38 are secured at their lower front ends to the sills 1, preferably by the same bolts 31 which secure the standards 26 and the seed chute 20 in place and extend upwardly and rearwardly therefrom, being braced by a bail 39 which is secured at its lower ends to the rear ends of the sills and extends upwardly past the handles to span the rear portion of the hopper, being secured to the handles, as indicated at 40.

The hopper 41 rests upon the side bars and has vertical side walls, while its front and rear walls converge downwardly, as clearly shown. A floor or bottom 42 extends between the front and rear walls of the hopper, and this floor is provided at its center with a slot 43 to accommodate the upper portion of the seed-dropping disk and fit closely thereto so that, while seed may enter the pockets of the disks, leakage of seed around the disk will be avoided. An open frame 44 is secured on the under side of the floor 42 to fit closely around the upper portion of the seed-dropping disk so as to further aid in preventing waste of the seed. In order that the seed may be prevented from collecting in the corners of the hopper and will be positively directed to the seed-dropping disks, deflectors 45 are provided in the form of plates secured rigidly to the sides of the hopper and to the front and rear walls of the same and converge to the slot 43, as will be understood. Mounted transversely in the upper part of the hopper at the center thereof is a stirrer shaft 46 which is adapted to rock in its bearings and has secured thereto a plurality of depending agitating fingers 47 which may be of any approved form and provided in any desired arrangement or number. To one end of the shaft 46 is secured a crank 48 which is connected by a link 49 with a crank 50 which is secured upon the end of the dropper shaft 9. It will now be understood that as the planter is drawn over the field the forward wheels 6 will be rotated by their tractive engagement with the ground and the rotation of the axle 5 will be transmitted through the described gearing and connections to rotate the dropper shaft and oscillate the agitating shaft so that portions of the seed will be taken into the pockets of the seed-dropping disk and carried around to be discharged through the seed chute 20. The stirrers or agitating fingers 47 will be constantly oscillated within the hopper so that the seed will be kept continually in such a condition that it will not clog and will flow freely into the pockets of the seed disk. Of course, the furrow opener 23 will form a furrow in the ground and the seed chute being alined with the furrow opener will direct the seed into the furrow. The coverers 27 following immediately behind the seed chute will return the loose soil into the furrow over the seed and the presser roller will then compress the loose soil into a firm condition upon the seed to facilitate the germination.

The hopper is not secured to the sills but is held firmly thereto by latches 51 pivoted upon the bolts 31 and having their free notched or hooked ends arranged to engage over studs 52 on the sides of the hopper. At its front end links 53 are pivoted to the sides of the hopper and the lower ends of these links are pivoted upon the sides of the sills. If, for any reason, access to the seed disks is desired, the link 49 is disengaged from the crank 48 or the crank 50 as may be preferred and the latches 51 are then swung out of engagement with the respective pins or studs 52. The hopper may then be swung forwardly and upwardly so that its rear end will pass from under the bracing arch 39, whereupon it may be reversed or moved forwardly to be supported by the forward end of the frame while the desired adjustment or repairing of the seed-dropping disk is accomplished. When the hopper is thus removed from over the seed disk, the entire disk will be exposed and will be accessible, and to remove it from the dropping shaft all that needs to be done is to release the attaching plate 18 so that the key 16 may be withdrawn from the slot of the disk, after which the disk may be readily lifted from the shaft.

My planter is very simple in the construction and arrangement of its parts, may be produced at a low cost and easily manipulated to plant seed in a highly efficient manner.

Having thus described the invention, I claim:

In a planter, the combination of a frame, a dropper shaft mounted in the frame, a dropper disk having a radial slot whereby it may be engaged over the shaft, a key insertible in the slot from the outer end thereof, an attaching plate carried by the key to bear against and be secured to the side of the disk, a hopper over the dropper disk, and means for rotating the dropper shaft.

In testimony whereof I affix my signature.

DOLPHUS L. JOHNSON. [L. S.]